United States Patent [19]
Peak

[11] Patent Number: 5,362,125
[45] Date of Patent: Nov. 8, 1994

[54] VAN SEAT AUXILIARY SUPPORT RAILS

[76] Inventor: Matthew L. Peak, 1150 Grand View Dr., P.O. Box 18, Grass Lake, Mich. 49240

[21] Appl. No.: 85,780

[22] Filed: Jul. 6, 1993

[51] Int. Cl.⁵ .............................................. A47C 13/00
[52] U.S. Cl. .................... 297/130; 297/133; 248/688
[58] Field of Search ............... 297/130, 131, 133, 239; 248/688, 188.8

[56] References Cited

U.S. PATENT DOCUMENTS

| | | | |
|---|---|---|---|
| 574,630 | 1/1897 | Reid et al. | 297/130 X |
| 1,367,390 | 2/1921 | Hinson | 297/133 |
| 2,535,212 | 12/1950 | Johnson | 297/130 X |
| 3,586,277 | 6/1971 | Voris | 297/239 X |
| 3,638,997 | 2/1972 | Shapiro et al. | 297/239 X |
| 3,999,801 | 12/1976 | Walters | 297/133 X |
| 4,717,169 | 1/1988 | Shaffer | 297/130 X |
| 4,772,067 | 9/1988 | Fowler | 297/130 |

FOREIGN PATENT DOCUMENTS

| | | | |
|---|---|---|---|
| 812354 | 8/1951 | Germany | 297/130 |
| 2111440 | 7/1983 | United Kingdom | 297/130 |

*Primary Examiner*—Laurie K. Cranmer
*Attorney, Agent, or Firm*—Beaman & Beaman

[57] ABSTRACT

Auxiliary support rails for a removable vehicle seat such as commonly found in mini vans permit the vehicle seat to be removed from the vehicle and used for general seating purposes. A pair of support rails cooperate with the conventional seat retainers including anchor pins which are locked to the retainers. The rail includes large area support flanges for supporting the seat upon all types of terrain. Auxiliary rollers may be attached to the rails to facilitate sea movement.

3 Claims, 2 Drawing Sheets

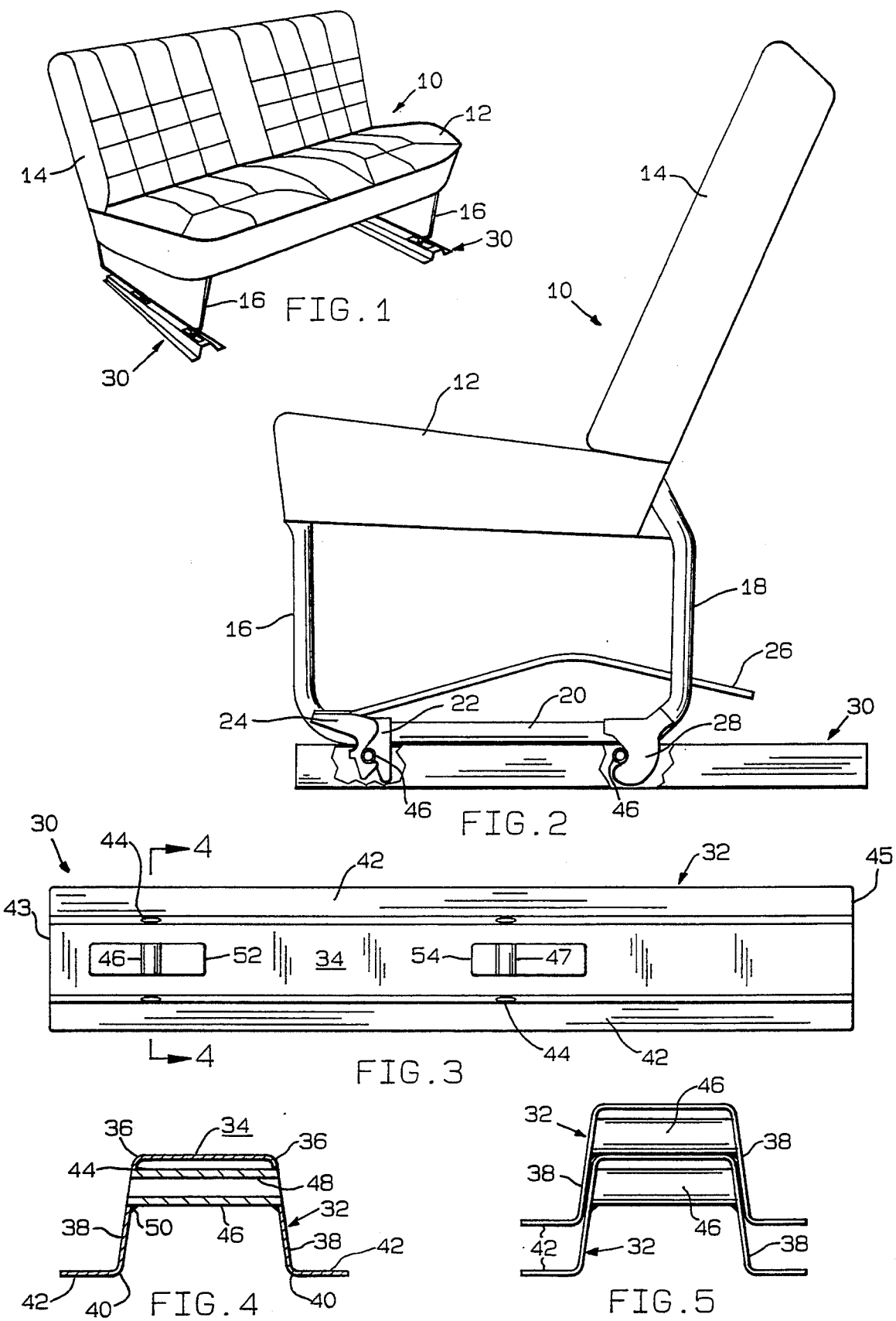

VAN SEAT AUXILIARY SUPPORT RAILS

BACKGROUND OF THE INVENTION

1. Field of the Invention

The invention pertains to auxiliary supports for removable vehicle seats for permitting the seat to be used outside the vehicle and adequately supported to provide a stable base.

1. Description of the Art

Many vehicle seats are removable from the vehicle for the purpose of increasing the vehicle caring capacity, or for rearranging the seats' location. Removable seats are commonly found in full size vans and mini vans. Such removable vehicle seats include lockable retainers for cooperating with anchors fixed within the vehicle whereby the seat may be rigidly locked thereto.

Often, during recreational use, it would be desirable to remove the bench seat of a mini van, for instance, whereby the vehicle seat could be used for general seating purposes outside of the vehicle, such as during camping, viewing sports, or the like. However, as vehicle seats are designed to cooperate with specific anchors, merely removing the seat and placing the same on the ground will not provide a stable base, and may possibly damage the seat retainers.

OBJECTS OF THE INVENTION

It is an object of the invention to provide an auxiliary seat support for removable vehicle seats wherein the seat may be locked to the support and a safe and stable seat base provided.

A further object of the invention is to provide support rails for a removable vehicle seat wherein the support rails are economical to manufacture, and may be readily carried within the vehicle in an unobtrusive location.

An additional object of the invention is to provide an auxiliary support for removable vehicle seats wherein the support includes anchors similar to those within the vehicle for cooperation with the seat retainers, and the seat will not be damaged or otherwise adversely affected by the auxiliary seat support.

Yet a further object of the invention is to provide an auxiliary seat support for removable vehicle seats wherein the seat support provides a broad base of support area to permit a seat to be placed upon soft ground, such as sand, and yet the configuration of the seat support is such that a pair of supports may be nested in a concise arrangement for storage purposes.

Another object of the invention is to provide removable wheels or rollers for an auxiliary removable vehicle seat support wherein anti-friction support for the seat and rails is provided to facilitate movement of the seat outside of the vehicle.

SUMMARY OF THE INVENTION

Removable vehicle seats for vans and mini vans usually employ hook type retainers for locking to anchor pins mounted within the van passenger or cargo space. Such anchor pins may be located above the van floor, or recessed within wells. At least one set of the hooks, either the front or rear hook sets, include releasable locking structure whereby once the retainers are locked to the pins the seat cannot be removed from the anchors, but actuation of a release handle permits the seat to be lifted from the pins and removed from the vehicle.

In accord with the inventive concepts, a pair of elongated metal rails are of such a configuration as to include anchor pins capable of cooperating with the seat retainers whereby the seat retainers may be locked to the rail pins in a manner identical to the locking of the seat within the vehicle. The rails include relatively large support flanges for engaging the ground upon which the seat is to be supported, whereby the seat may be adequately supported upon soft ground, sand, and the like, and the rail will maintain the seat retainers above the ground level and prevent damage to the seat retainers.

The seat retainers may be easily released from the rail locking pins, and the anchor pins are so located on the rail, and the rail length so related to the anchor pins, as to provide adequate support for the seat when occupied to prevent the seat from tipping over backward, or forward.

Roller or wheel sets are disclosed in accord with the inventive concepts for use with the rails whereby the rollers will permit the weight of the seat and rails to be substantially carried by the rollers for facilitating seat movement outside of the vehicle. The rollers may be very quickly attached to, or removed from, the rails.

Auxiliary vehicle seat supporting rails in accord with the invention are economical to manufacture, are of such a configuration as to permit nesting for concise storage, and require no special skills on the part of the user.

BRIEF DESCRIPTION OF THE DRAWING

The aforementioned objects and advantages of the invention will be appreciated from the following description and accompanying drawings wherein:

FIG. 1 is a perspective view of a vehicle seat removed from the vehicle and supported upon the auxiliary support rails of the invention, FIG. 2 is an end view of a vehicle seat supported upon the auxiliary support rails, portions of the rails being broken away to illustrate the seat retainers and rail anchor pin structure, FIG. 3 is a top plan view of a seat support rail in accord with the invention, FIG. 4 is an elevational sectional view as taken through an anchor pin along Section 4—4 of FIG. 3, FIG. 5 is an end elevational view illustrating a pair of vehicle seat support rails stored in a nested relationship.

DESCRIPTION OF THE PREFERRED EMBODIMENT

Figure 7:
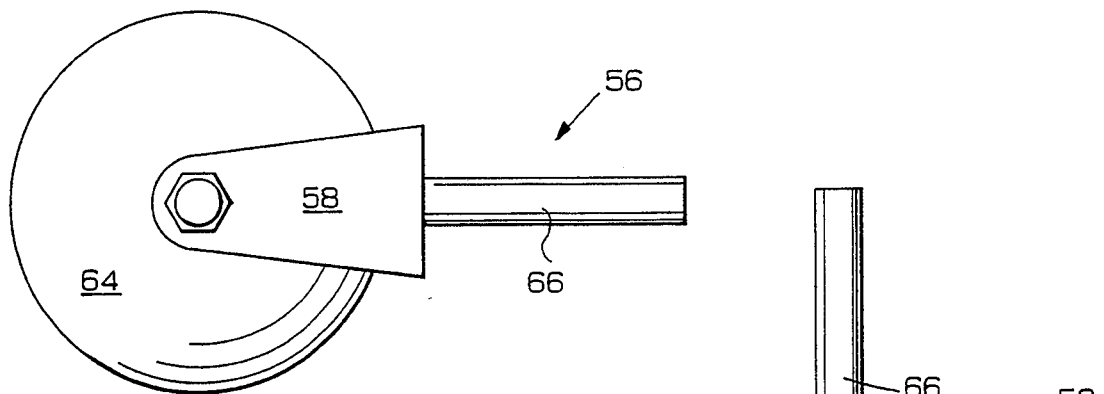
FIG. 7 is an end view of the roller of FIG. 6 as taken from the right thereof.

A typical removable vehicle bench seat 10 is shown in FIG. 1, such as found in vans and mini vans. Such seats include a lower cushion 12, a back cushion 14, front legs 16, rear legs 18, and the front and rear legs on a common end of the seat may be interconnected by a base member 20, FIG. 2.

Front hooks 22 are mounted upon the front legs 16 adjacent the base 20, and the front hooks include a pivotal lock 24 operated by handle 26 which permits the lock 24 to be selectively operated to simultaneously release the front hooks 22 from the associated anchor pins as exist on the vehicle, not shown. The seat 10 also includes a pair of rear hooks 28 which cooperate with anchor pins formed in the vehicle, not shown, and with the retainer hooks 22 and 28 firmly connected to the vehicle anchor pins the seat 10 is firmly locked within the vehicle. Merely by operating the handle 26 the lock 24 may be operated to release the front hook 22, and rearward movement of the seat will disengage the rear hook 28 from its vehicle anchor pin and permit the seat 10 to be removed from the vehicle.

The auxiliary seat support in accord with the invention is generally indicated at 30 and comprises an elongated metal rail 32. A pair of identical rails 32 are associated with the vehicle seat structure as shown in FIG. 1 wherein the rails 32 constitute the support for the seat 10 upon being removed from the vehicle. The rails 32 are of identical construction and only a description of one rail is necessary to understand the inventive concepts.

The rail 32 includes a flat upper panel 34 having an upper surface, and laterally the panel 34 is defined by edges 36 constituting the intersection of the panel 34 with the rail side walls 38. The rail side walls 38, as will be readily appreciated from FIGS. 4 and 5, converge slightly in an upward direction toward the panel 34, and each of the side walls 38 includes a lower edge 40 constituting the intersection with the rail flanges 42, a flange being associated with the lower edge of each of the side walls. The flanges 42 extend outwardly away from each other, and are of sufficient length whereby the lower surface of the flanges constitutes a relatively large area support surface for bearing the weight of the seat and its occupants.

The rail includes ends 43 and 45, and holes 44 are located within the side walls 38 in opposed aligned relationship for receiving the anchor pins 46 and 47. The anchor pins 46 and 47 are of a tubular configuration and each includes an inner cylindrical bore 48. The ends of the anchor pins 46 and 47 are located within the openings 44 formed in side walls 38, and welds 50, FIG. 4, prevent the anchor pins from shifting in a longitudinal direction with respect to the rail side walls.

As will be appreciated from FIG. 3, a rectangular opening 52 located adjacent rail end 43 directly above the pin 46 provides access to the anchor pin 46 through the panel 34. In a similar manner, a rectangular opening 54 located above the anchor pin 47 provides access to the pin 47 through the panel 34.

In order to use the seat support rails of the invention, after the seat 10 is removed from the vehicle, a pair of rails 32 may be aligned in a parallel relationship spaced apart a distance equal to the front and rear leg retainers of the seat. Alternatively, the seat may be inverted and the rails 32 thereby attached to the anchor pins. As will be appreciated from FIG. 2 the anchor pin 46 receives a front hook 22 as inserted through the opening 52. Cooperation of the front hook 22 and lock 24 with the pin 46 will firmly lock the seat retaining hook 22 to the rail anchor pin 46. In a similar manner, the seat rear hook 28 is inserted through the rail opening 54 whereby the seat rear retainer hook 28 will firmly cooperate with the rail anchor pin 47.

The sequence of the connection of the seat retaining hooks to the rail anchor pins may vary in accord with the particular type of locking system and hooks used with the van seat. In some constructions the front hooks are releasably locked to anchor pins, while in other constructions it is the rear hooks that are releasably locked to the rail anchor pins.

Upon the rails 32 being connected to the seat legs and retainers as shown in FIG. 1, the seat 10 may be placed upon the ground, sand, lawn, or the like and used as portable bench seat. In that the anchor pins 46 and 47 are so related to the rail ends 43 and 44 such that a significant portion of the rail extends to the rear of the seat 10, as will be appreciated from FIG. 2, the likelihood of the seat 10 tipping over backward is substantially eliminated, and the rails 32 provide a firm and safe support for the seat 10. The relatively large supporting area provided by the flanges 42 prevents the rails from sinking into soft terrain or sand, and the rails 32 provide effective, attractive and safe auxiliary support for the seat 10 substantially increasing the use of a removable vehicle seat.

When it is desired to remove the rails 32 from the seat 10, the handle 26 is moved to the unlock position and the retaining hooks 22 and 28 are released from the associated pins 46 and 47 and pulled from the rail openings 52 and 54.

The rails 32 are of a concise configuration and may nest upon each other as shown in FIG. 5 as to be readily stored beneath the vehicle seat as installed within a vehicle.

An accessory for the rails 32 which facilitates movement of the vehicle seat when mounted upon rails 32 and located exteriorly of the vehicle is illustrated in FIGS. 6–9. This accessory takes the form of a wheel support 56 for providing anti-friction means for supporting the assembled seat 10 and rails 32.

The wheel support 56 includes a yoke 58 having legs through which the shaft 60 extends and is maintained in position by the nut 62. A roller 64 is rotatably mounted upon the shaft 60, and a cylindrical stem 66 centrally extends from the base of the yoke 58 as will be appreciated from FIGS. 6 and 7.

Figure 8:
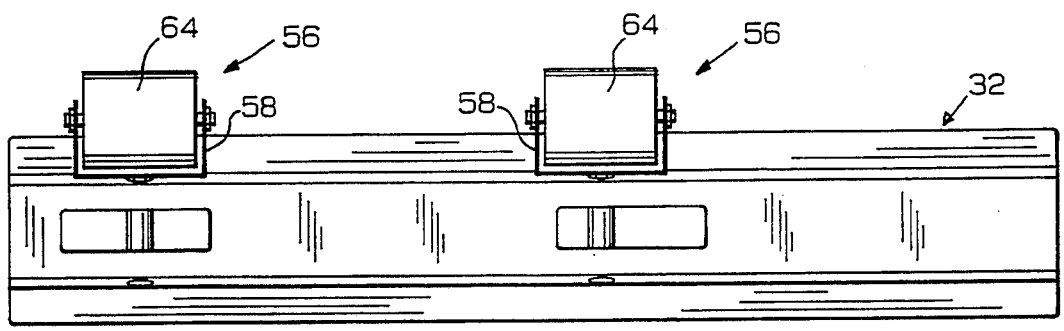
FIG. 8 is a top plan view of a vehicle support rail illustrating a pair of rollers supported within the rail anchor pins.

The diameter of the stem 66 is such as to be closely received within the anchor pin bore 48, and yet the stem 66 will be rotatable within the anchor pin bore. The stem 66 may be inserted into the anchor pin bore until the base of the yoke engages the adjacent rail side wall 38. This relationship is shown in FIG. 8 wherein a pair of wheel supports 56 have been mounted upon the rail 32.

Figure 9:
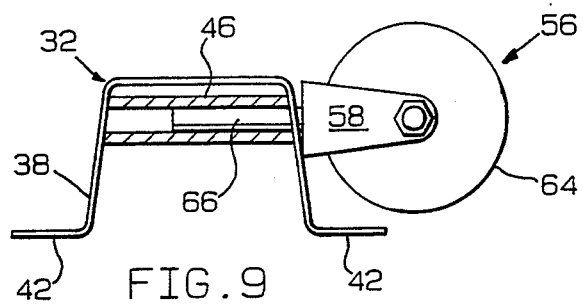
FIG. 9 is an end elevational view of a rail and roller of FIG. 8 as taken from the right thereof, the anchor pin being shown in section.

As will be appreciated from FIG. 9, the diameter of the roller 64 is such that the roller is located only slightly above the associated rail flange 42, and in this manner when the rails 32 are resting upon a support surface the rollers 64 will not be engaging the support surface. However, as the supports 56 extend from the "outside" of a rail 32 upon lifting the other end of a seat 10 assembled to rails 32 the rollers 64 will engage the ground and if the end of the seat remote from the rollers is raised high enough the complete weight of the seat and rails may be supported upon the rollers 64 and the seat very easily moved due to the anti-friction characteristics of the rollers 64. Pivoting of stem 66 within the anchor pins automatically aligns the rollers to the level of the ground.

Figure 6:
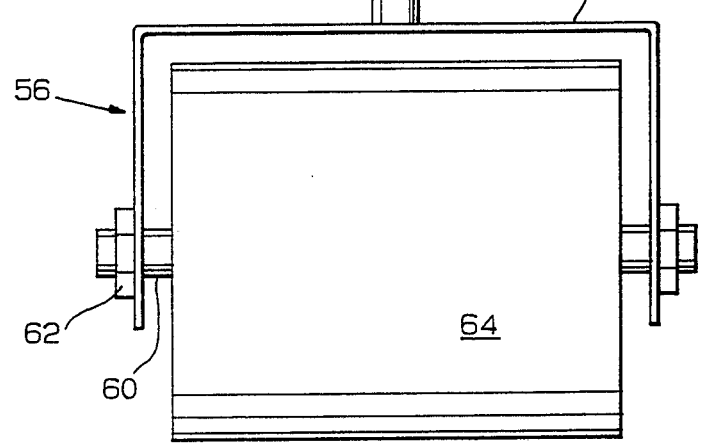
FIG. 6 is a top plan view of a rail supporting roller.

Utilization of the wheel supports 56 only requires insertion of the stem 66 into the anchor pin bores, and the roller apparatus shown in FIGS. 6 and 9 is of economical manufacture and cost, and may be readily used by the unskilled to gain increased usage of the advantages provided by the seat auxiliary supports 30.

It is appreciated that various modifications to the inventive concepts may be apparent to those skilled in the art without departing from the spirit and scope of the invention.

I claim:

1. An auxiliary portable support for removable automobile seats having releasable front and rear retainers selectively locked to vehicle anchors comprising, in combination, an elongated rail having a lower load bearing surface adapted to rest upon a supporting surface, a longitudinal axis, ends, an upper surface, a pair of seat retainer receiving rail anchors defined on said rail adjacent said upper surface and longitudinally spaced from each other for attachment to the seat retainers whereby attaching the seat retainers to said rail anchors provides a universal support for a seat removed from a vehicle, said rail transverse cross section including a pair of spaced vertically oriented walls, said rail anchors comprising pins extending between and mounted upon said walls, said wall each having an upper end, an upper panel extending between said wall's upper ends, said upper surface being defined upon said panel, openings defined in said panel adjacent said pins providing access to said pins, said anchor pins being tubular, wheel support structure selectively receivable within said pins, and a wheel mounted upon said wheel support structure 2. An auxiliary portable support for removable automobile seats having front and rear retainers selectively locked to vehicle anchors comprising, in combination, an elongated, open, sheet metal formed rail having an upper panel, a pair of spaced side walls extending downwardly from said panel each having a lower end and a flange extending from each side wall lower end, said flanges extending outwardly away from each other, a pair of spaced seat retainer receiving anchors mounted on said rail each being disposed between said side walls below said upper panel, an opening defined in said upper panel above each anchor providing access thereto, said side walls being tapered with respect to each other converging from said flanges toward said panel to permit stacking of a plurality of rails.

3. An auxiliary portable support for removable automobile seats having front and rear retainers selectively locked to vehicle anchors comprising, in combination, an elongated rail having an upper panel, a pair of spaced side walls extending downwardly from said panel each having a lower end and a flange extending from each side wall lower end, a pair of spaced seat retainer receiving anchors mounted on said rail each being disposed between said side walls below said upper panel, an opening defined in said upper panel above each anchor providing access thereto, said anchors comprising pins having ends extending through holes defined in said side walls, said pins being tubular having accessible open ends, a wheel, a yoke rotatably supporting said wheel, a support shaft mounted on said yoke, said support shaft being receivable within the end of an anchor pin to locate and support said wheel adjacent a rail flange whereby said wheel is capable of supporting said rail upon raising of the other rail flange.

* * * * *